US012592399B2

(12) United States Patent (10) Patent No.: US 12,592,399 B2
Keitsch et al. (45) Date of Patent: Mar. 31, 2026

(54) BIPOLAR PLATE HAVING INCLINED INFLOW DUCT PORTIONS FOR A FUEL CELL STACK, FUEL CELL SYSTEM AND MOTOR VEHICLE

(71) Applicant: AUDI AG, Ingolstadt (DE)

(72) Inventors: Oliver Keitsch, Heilbronn (DE); Fabian Lippl, Mannheim (DE); Armin Siebel, Neckarsulm (DE); Sebastian Voigt, Nienburg/Weser (DE)

(73) Assignee: AUDI AG, Ingolstadt (DE)

( * ) Notice: Subject to any disclaimer, the term of this patent is extended or adjusted under 35 U.S.C. 154(b) by 371 days.

(21) Appl. No.: 18/245,323

(22) PCT Filed: Feb. 11, 2022

(86) PCT No.: PCT/EP2022/053336
§ 371 (c)(1),
(2) Date: Mar. 14, 2023

(87) PCT Pub. No.: WO2022/171781
PCT Pub. Date: Aug. 18, 2022

(65) Prior Publication Data

US 2023/0402621 A1 Dec. 14, 2023

(30) Foreign Application Priority Data

Feb. 15, 2021 (DE) ..................... 10 2021 103 436.1

(51) Int. Cl.
*H01M 8/026* (2016.01)
*B60L 50/72* (2019.01)
(Continued)

(52) U.S. Cl.
CPC ............. *H01M 8/026* (2013.01); *B60L 50/72* (2019.02); *H01M 8/1004* (2013.01);
(Continued)

(58) Field of Classification Search
CPC .... H01M 8/026; H01M 8/1004; H01M 8/241; H01M 8/0258; H01M 8/04753; H01M 8/04761; H01M 8/0202; B60L 50/72
See application file for complete search history.

(56) References Cited

U.S. PATENT DOCUMENTS

2009/0176143 A1* 7/2009 Ichikawa ............ H01M 8/2484
                                                            429/413
2009/0181282 A1* 7/2009 Tsunoda .............. H01M 8/2432
                                                            429/454
(Continued)

FOREIGN PATENT DOCUMENTS

CN       105839136 A     8/2016
DE   11-2004-002468 T5   11/2006
(Continued)

OTHER PUBLICATIONS

International Preliminary Report on Patentability and Written Opinion, dated Aug. 15, 2023, for International Patent Application No. PCT/EP2022/053336. (6 pages).
(Continued)

*Primary Examiner* — Stewart A Fraser
(74) *Attorney, Agent, or Firm* — Seed Intellectual Property Law Group LLP

(57) ABSTRACT

A bipolar plate for a fuel cell stack of a fuel cell system is described, having at least one main duct portion, which is designed for feeding a fluid (R1, R2, K); a plurality of inflow duct portions that branch off the main duct portion; a plurality of distribution duct portions fluidically connected to the inflow duct portions. The inflow duct portions are arranged along at least a part of the circumferential contour of the main duct portion such that each inflow duct portion, with regard to an imaginary orthogonal, in a respective connecting region of the inflow duct portion and main duct portion, to the circumferential contour at that location, is (Continued)

inclined with respect to this orthogonal such that, between the orthogonal and an inflow duct axis, an angle of incidence is formed, wherein, on the basis of the inclined arrangement of the inflow duct portions, a swirling flow for the fluid flowing in is able to be generated in the main duct portion.

12 Claims, 3 Drawing Sheets

(51) Int. Cl.

| | | |
|---|---|---|
| *H01M 8/10* | (2016.01) | |
| *H01M 8/1004* | (2016.01) | |
| *H01M 8/241* | (2016.01) | |

(52) U.S. Cl.
CPC .... *H01M 8/241* (2013.01); *H01M 2008/1095* (2013.01); *H01M 2250/20* (2013.01)

(56) References Cited

U.S. PATENT DOCUMENTS

| | | | |
|---|---|---|---|
| 2011/0053031 A1* | 3/2011 | Kojima | H01M 8/2483 |
| | | | 429/455 |
| 2017/0033373 A1 | 2/2017 | Mohr et al. | |

FOREIGN PATENT DOCUMENTS

| | | | |
|---|---|---|---|
| DE | 20-2018-103058 U1 | 9/2019 | |
| DE | 10-2019-001337 A1 | 8/2020 | |
| EP | 1942546 A1 | 7/2008 | |
| EP | 2299527 A1 | 3/2011 | |

OTHER PUBLICATIONS

International Search Report, dated Jun. 1, 2022, for International Patent Application No. PCT/EP2022/053336. (5 pages).

* cited by examiner

BIPOLAR PLATE HAVING INCLINED INFLOW DUCT PORTIONS FOR A FUEL CELL STACK, FUEL CELL SYSTEM AND MOTOR VEHICLE

BACKGROUND

Technical Field

This disclosure relates to a bipolar plate for a fuel cell stack of a fuel cell system comprising at least one main duct portion designed to supply a fluid; a plurality of inflow duct portions that branch off from the main duct portion; and a plurality of distribution duct portions in fluid communication with the inflow duct portions.

Description of the Related Art

From the document DE 10 2019 001 337 A1, a separator plate for a fuel cell stack is known, in which outlet duct portions which are connected to a main duct for the discharge of a fluid are arranged in such a way that a flow-related fluid separation can take place in the main discharge duct. A circular bipolar plate is known from CN 105839136 A, with distribution ducts arranged in a spiral.

So-called bipolar plates are used in fuel cells to supply media to the electrochemically active surfaces. The bipolar plates and electrochemically active membrane units are assembled alternatingly to form so-called fuel cell stacks in order to achieve the highest possible voltage by connecting the individual cells in series. In this, the distribution of the reaction media (reactants) to the usually several hundred individual cells takes place via an opening (main duct portion) which penetrates all individual cells and leads to the formation of a main duct for the respective medium or reactant. From these main ducts, the usually three media or alternatively fluids (two reactants and one coolant) are introduced via radially oriented openings in the direction of the active area.

The main duct must have a constant cross-section over its course because, for economic reasons, the individual cells are manufactured with the same geometry. Therefore, the inflow of fluid, especially reactants, into the first individual cells of the stack, is usually very poor due to the high flow velocities in the main duct (at the beginning of the main duct, where the complete mass flow of the fluid in question is present). The constant cross-section of the main duct makes it difficult to optimize an uniform distribution of fluid to the various individual cells.

BRIEF SUMMARY

Embodiments of the invention provide a bipolar plate in which the media or fluids, in particular the reactants, can be better distributed as they flow into or are supplied to the fuel cell or fuel cell stack.

A bipolar plate for a fuel cell stack of a fuel cell system is proposed, comprising at least one main duct portion designed to supply a fluid; a plurality of inflow duct portions that branch off from the main duct portion; and a plurality of distribution duct portions in fluid communication with the inflow duct portions. In this regard, it is provided that the inflow duct portions are arranged along at least a part of the circumferential contour of the main duct portion in such a manner that each inflow duct portion is designed orthogonally inclined, with respect to an imaginary orthogonal in a respective connecting region of the inflow duct portion and the main duct portion to the circumferential contour present there, in such a way that a pitch is formed between the orthogonal and an inflow duct axis, wherein it is possible to generate a swirling flow for the inflowing fluid on the basis of the inclined arrangement of the inflow duct portions in the main duct portion. Using an inclined arrangement of the inflow duct portions, which can also be referred to as a quasi-tangential alignment of the inflow duct portions, a slight swirl can be imposed on the flow of the fluid in question in the main duct, which is formed from a plurality of main duct portions. In this manner, the inflow of fluid into the first cells can be improved by redirection towards a swirling flow. Depending on the pitch of the inflow duct portions, the degree of swirl can be varied so that there is a uniform distribution in the individual cells and an optimization of pressure loss via the main duct. The optimized design of the media inlet (inclined inflow duct portions) into the bipolar plate (distribution duct portions) thus forces a swirling flow in the main duct, which improves the media/fluid flow and the uniform distribution through the fuel cell stack.

With bipolar plates, the inflow duct portions can be distributed along the entire circumferential contour of the main duct portion. This allows the swirling flow generated in the main duct to be fully utilized to improve the distribution of fluid into the inflow ducts and thus into the individual cells.

With bipolar plates, the inflow duct portions can open into at least one collection duct portion connected to the distribution duct portions. Using such a collection duct portion, the fluid flowing in from the main duct can be uniformly distributed to the distribution duct portions. The at least one collection duct portion can extend along a part of the circumferential contour of the main duct portion or along the entire circumferential contour of the main duct portion.

With bipolar plates, the pitch can lie in a range from 10° to 80°, in particular between 20° to 70°. The pitches of individual inflow duct portions or/and groups of inflow duct portions can be set or alternatively selected depending on their position relative to the circumferential contour. This allows the desired swirling flow in the main duct to be generated and influenced.

Also proposed is a fuel cell stack with a plurality of bipolar plates described above and with several membrane units arranged between each two adjacent bipolar plates, wherein the respective main duct portions of the bipolar plates form a continuous main duct for a fluid of the fuel cell stack. In such a fuel cell stack, the main duct can be connected to a fluid supply element arranged on the inlet side, wherein the fluid supply element is designed in such a way that the flow of the fluid, before or upon entry into the main duct, is at least partially caused to form a swirling flow. For example, the fluid supply element can have a corresponding geometry or/and have at least one flow guide element. The flow guide element can be inclined or/and curved with respect to a main direction of fluid flow, such that the fluid flow is or alternatively can be deflected with respect to a swirling flow to be generated.

In the fuel cell stack, the at least main duct portion or alternatively, the respective main duct for the supply of the reactants, in particular hydrogen and air or oxygen, can be designed with inclined inflow duct portions, such that based on the inclined arrangement of the inflow duct portions in the respective main duct for the respective reactant, it is possible to generate a swirling flow for the inflowing reactant.

A fuel cell system may comprise at least one fuel cell stack described above.

A motor vehicle, in particular an at least partially electrically driven motor vehicle, may be designed with or may have such a fuel cell system.

DETAILED DESCRIPTION

Figure 1:
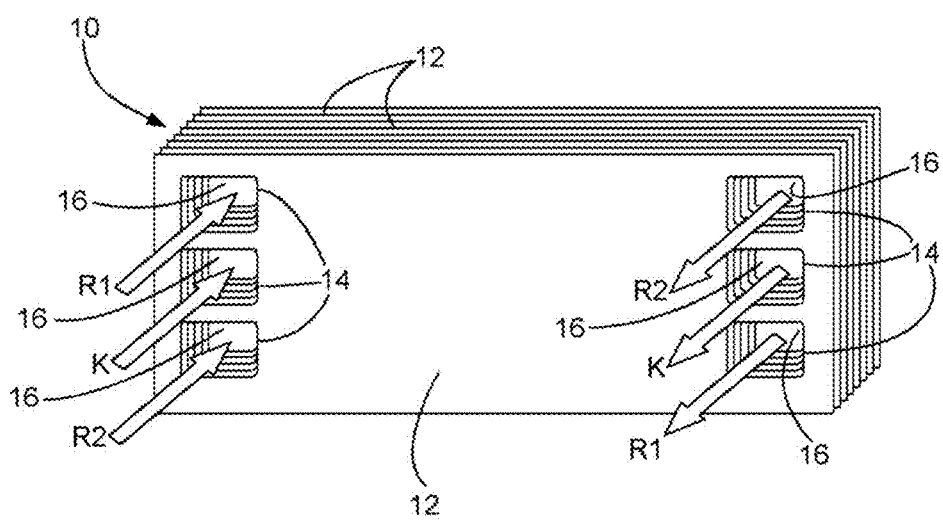
FIG. 1 shows a schematic representation of a fuel cell stack.

FIG. 1 shows a schematic representation of a fuel cell stack 10 with a plurality of bipolar plates 12. Only some bipolar plates 12 are shown in the illustration, whereby it is pointed out that a usual fuel cell stack 10 has many more than the number of bipolar plates 12 indicated here.

The respective main duct portions 14 are illustrated in the bipolar plates 12. By arranging the bipolar plates 12 all in a row, a plurality of main duct portions 14 form a respective main duct 16 in the fuel cell stack.

By way of example, a fuel cell stack 10 is shown in FIG. 1, with input side main ducts 16 for two reactants R1, R2 and one coolant K, which is illustrated by the respective arrows.

As is generally known, bipolar plates 12 are used in fuel cells to supply media to the electrochemically active surfaces. The bipolar plates 12 and electrochemically active membrane units, which are not shown in detail, are alternatingly assembled to form the fuel cell stack 10 in order to achieve the highest possible voltage by connecting the individual cells in series. The distribution of the reaction media R1, R2 (reactants) to the usually several hundred individual cells takes place via an opening (main duct portion 14) penetrating all individual cells, which leads to the formation of the main duct 16 for the respective medium or the respective reactant R1, R2. Leaving from these main ducts 16, the usually three media or fluids (two reactants R1, R2 and one coolant K) are introduced via radially oriented openings in the direction of the active area.

Figure 2:
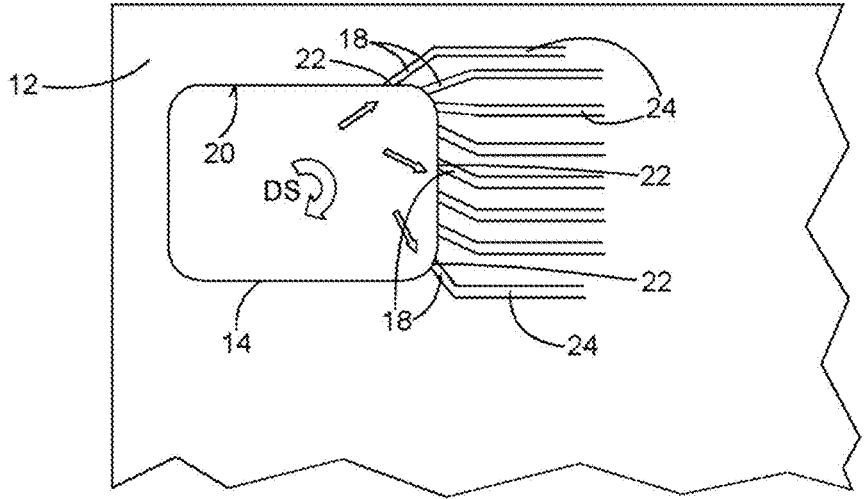
FIG. 2 shows a schematic representation of a bipolar plate having a main duct portion and inflow duct portions.

FIG. 2 shows a schematic representation of an enlarged partial representation of a bipolar plate 12 and an inlet side main duct portion 14. The main duct portion 14 therefore serves to supply a fluid or alternatively a reactant to the fuel cell or fuel cell stack 10. It can be the main duct portion 14 which serves to form the main duct 16 for the reactant R1. What is described below with respect to the main duct portion 14 of the bipolar plate 12 shown here may also apply to other main duct portions 14 of the same bipolar plate 12 or alternatively of further bipolar plates 12 of the fuel cell stack 10. It should be noted that the following embodiments relate to the input side or the supply side of the fuel cell stack 10 or alternatively of the bipolar plates 12.

A plurality of inflow duct portions 18 extend from the main duct portion 14. Medium, or alternatively fluid, flowing through the main duct portion 14, in particular a reactant R1, R2, is supplied by means of the inflow duct portions 18 to the active region of the fuel cell, which is not further shown.

The inflow duct portions 18 are arranged along at least a part of a circumferential contour 20 of the main duct portion 14 in such a way that each inflow duct portion 18 is designed to be orthogonal to the circumferential contour 20 present in a respective connecting region 22 of inflow duct portion 18 and main duct portion 14, and to be inclined with respect thereto.

Figure 4:
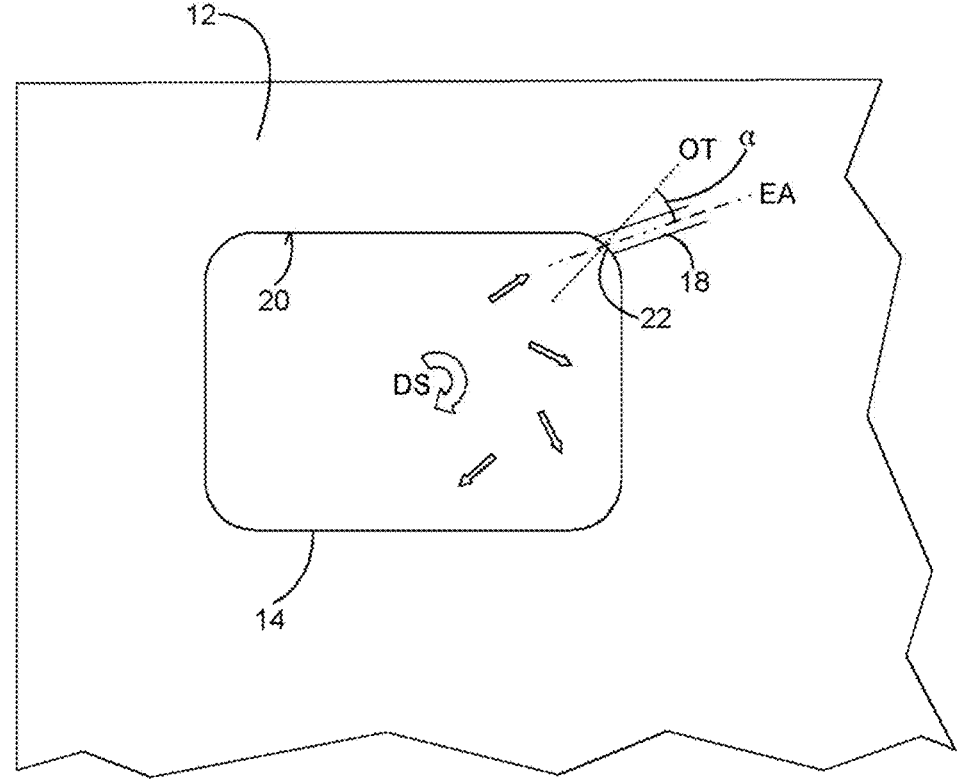
FIG. 4 shows a schematic, slightly enlarged representation of the main duct portion to illustrate the pitch of the inflow duct portions.

This is shown, by way of example, for a single inflow duct portion 18, in a somewhat enlarged manner in FIG. 4. In this case, the inflow duct portion 18 or alternatively all inflow duct portions 18, are designed in such a way that a pitch a is formed between the orthogonal OT and an inflow duct axis EA. In so doing, based on the inclined arrangement of the inflow duct portions 18 in the main duct portion 14, it is possible to generate a swirling flow for the inflowing fluid, in particular the reactants R1, R2. The orthogonal OT in the connection portion can also be understood as a radial direction in the case of a curved or alternatively bent course of the circumferential contour 20. The pitch can, for example, be in a range of about 10° to 80°, preferably about 20° to 70°.

The design of the circumferential contour 20 of the main duct portion 18 is shown, by way of example, here in FIG. 1 to FIG. 5, as a rectangle with rounded corners. However, it is pointed out that this is merely a possible embodiment. The arrangement of the inflow duct portions 18 at a pitch can also be implemented, for example, with a circular circumferential contour. In this case, the mentioned orthogonal in each connection area is the radial direction of the circular main duct portion 14. Of course, other geometric shapes of the circumferential contour 20 are also conceivable.

Figure 3:
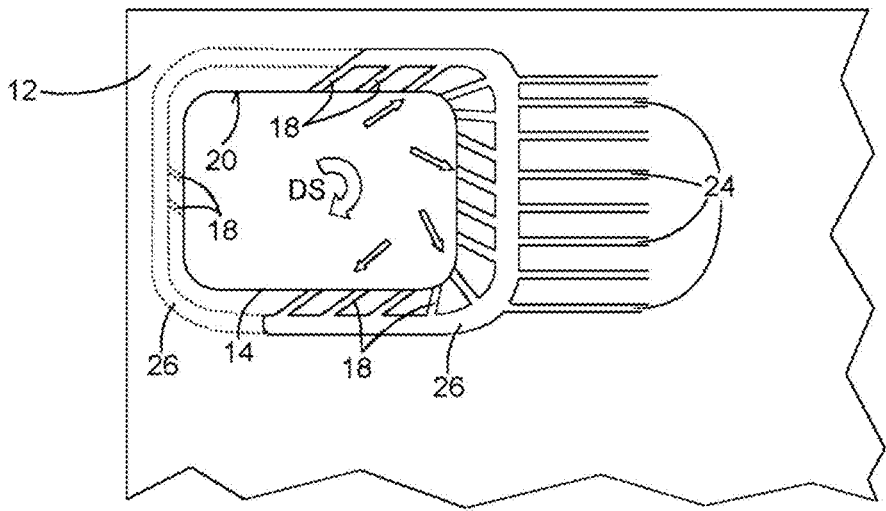
FIG. 3 shows a schematic representation of a bipolar plate having a main duct portion, inflow duct portions, and collection duct portion.

The generation of the swirling flow DS is illustrated by the curved arrow in FIG. 2 and FIG. 3. Here, the swirling flow DS is achieved by the non-orthogonal or alternatively non-radial alignment of the inflow duct portions 18. In other words, arranging the inflow duct portions 14 at a respective pitch assists in generating a swirling flow DS throughout the main duct 16. Due to the generated swirling flow DS, an improved distribution of the relevant medium or fluid, in particular reactants R1, R2, is achieved, such that the fluid can be guided to the respective active areas of the individual fuel cells in an evenly distributed manner over the entire length of the main duct 16.

FIG. 2 shows an example in which the inflow duct portions 18 transition directly into distribution duct portions 24. In the example shown in FIG. 2, the distribution duct portions 24 are designed essentially parallel to each other, at least in the connection with the respective inflow duct portions 18. The further course of the distribution duct portions 24, not shown here, can be designed according to common designs of bipolar plates.

FIG. 3 shows an example in which the inflow duct portions 18 first open into a collection duct portion 26. The collection duct portion 26 is in communication with the distribution duct portions 24. As can be seen from FIG. 3, the collection duct portion 26 extends along a part of the circumferential contour 20 of the main duct portions 14. Alternatively, a collection duct portion 26 can also be designed along the entire circumferential contour 20 of the main duct portions 14, which is additionally shown in dashed lines in FIG. 3. Using the collection duct portion 26, the inflowing fluid can additionally be distributed more homogeneously or uniformly to the plurality of distribution duct portions 24 and thus be supplied to the active areas of the fuel cells.

Figures 5, 6:
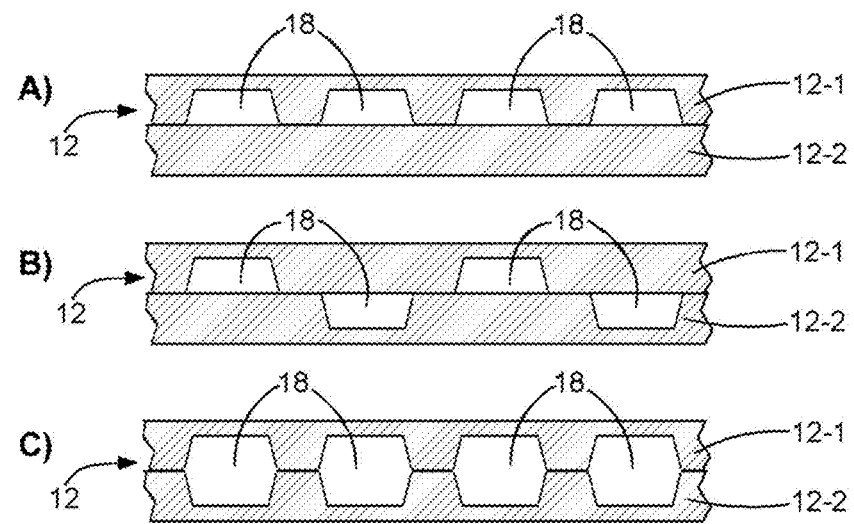
FIG. 5 shows a schematic illustration of the arrangement of inflow duct portions in one or/and two adjacent bipolar plates.
FIG. 6 shows a schematic representation of a fuel cell stack in a housing with a fluid supply element.

In subfigures A) to C), FIG. 5 shows examples of bipolar plates 12 with different arrangements of the inflow duct portions 18 in respective bipolar plate halves 12-1, 12-2. According to the example of FIG. 5A, all inflow duct portions 18 are formed in the same bipolar plate half 12-1. According to the example of FIG. 5B, the inflow duct portions 18 are formed alternatingly in the two bipolar plates halves 12-1, 12-2. According to the example of FIG. 5C, the inflow duct portions 18 are formed one above the other in both bipolar plates halves 12-1, 12-2, whereby a larger cross-section of the inflow duct portions 18 can be formed.

The trapezoidal embodiment of the inflow duct portions 18 shown in FIG. 5 is purely by way of example. The inflow duct portions 18 or/and the distribution duct portions 24 or/and a collection duct portion 26 can also have another cross-sectional shape, for example, semicircular or rectangular or the like.

FIG. 6 shows a simplified and schematic view of a fuel cell stack which is not visible and which is accommodated in a fuel cell housing 28. By way of example, with reference to FIG. 6, a fluid supply element 30 is shown on the left side of the fuel cell housing 28, in which the fluid supply element 30 is connected to a non-visible main duct for a respective fluid, or alternatively for a respective reactant R1, R2. The fluid supply element 30 is designed in such a way that the flow of the fluid or alternatively of the respective reactant, before or upon entry into the non-visible main duct, is at least partially caused to form a swirling flow. The fluid supply element 30 can, for example, have a corresponding geometry or/and have at least one flow guide element 32. Thereby, the flow guide element 32 can be inclined or/and curved with respect to a main flow direction HS of the fluid, such that the fluid flow is or can be deflected with respect to a swirling flow to be generated. For example, it is conceivable that rib-like structures are arranged along an inner circumference of the fluid supply element 30 for generating a swirling flow. It is also conceivable to arrange a centrally or concentrically arranged flow guide element 32 in the fluid supply element 30, which, for example, has substantially radially extending profile elements, for generating a desired swirling flow.

An inclined arrangement of the inflow duct portions 18, which can also be referred to as a quasi-tangential alignment of the inflow duct portions 18, can impose a slight swirl on the flow of the respective fluid or alternatively of the reactants R1, R2 in the main duct 16, in which the main duct 16 is formed from several main duct portions 14. The redirection towards a swirling flow can thereby improve the inflow of fluid into the first fuel cells. Depending on the pitch a of the inflow duct portions 18, the degree of swirl can be varied so that there is a uniform distribution in the individual cells and an optimization of pressure loss via the main duct 16. The optimized design of the media inlet (inclined inflow duct portions 18) into the bipolar plate (distribution duct portion 24), thus forces a swirling flow in the main duct 16, which improves the media/fluid flow and the uniform distribution through the fuel cell stack 10.

The fuel cell stack 10, described above with reference to FIG. 1 to FIG. 6, may be used or alternatively mounted in an at least partially electrically driven motor vehicle, in particular as part of a fuel cell system of the motor vehicle.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate for a fuel cell stack of a fuel cell system, the bipolar plate comprising:
   at least one main duct portion designed to supply a fluid;
   a plurality of inflow duct portions that branch off from the main duct portion; and
   a plurality of distribution duct portions in fluid communication with the inflow duct portions,
   wherein the inflow duct portions are arranged along at least a part of a circumferential contour of the main duct portion that includes one or more linear portions and one or more curvilinear portions, wherein the inflow duct portions are oriented in such a way that each inflow duct portion is designed orthogonally inclined relative to an imaginary orthogonal in a respective connecting region of the inflow duct portion and the main duct portion to the circumferential contour present there, in such a way that a pitch is formed between each imaginary orthogonal and a respective inflow duct axis of each respective inflow duct portion, wherein at least some of the inflow duct axes vary in orientation from each other along the circumferential contour of the main duct portion, and wherein a swirling flow for the inflowing fluid is generated about a longitudinal axis of the main duct portion during operation of the fuel cell system on the basis of the inclined arrangement of the inflow duct portions in the main duct portion.

2. The bipolar plate of claim 1, wherein the inflow duct portions are distributed along the entire circumferential contour of the main duct portion.

3. The bipolar plate according to claim 1, wherein the inflow duct portions open into at least one collection duct portion connected to the distribution duct portions.

4. The bipolar plate according to claim 3, wherein the at least one collection duct portion extends along a part of the circumferential contour of the main duct portion or along the entire circumferential contour of the main duct portion.

5. The bipolar plate according to claim 1, wherein the pitch is in a range from 10° to 80°.

6. A fuel cell stack, comprising:
   a plurality of bipolar plates according to claim 1; and
   a plurality of membrane units arranged between each two adjacent bipolar plates, wherein the respective main duct portions of the bipolar plates form a continuous main duct for a fluid of the fuel cell stack.

7. The fuel cell stack according to claim 6, wherein the main duct is connected to a fluid supply element arranged on the inlet side, wherein the fluid supply element is designed in such a way that the flow of the fluid, before or upon entry into the main duct, is at least partially caused to form a swirling flow.

8. The fuel cell stack according to claim 6, wherein at least the main duct portion or the main duct for the supply of the reactants are designed with inclined inflow duct portions such that, based on the inclined arrangement of the inflow duct portions in the respective main duct for the respective reactant, a swirling flow can be generated for the inflowing reactant.

9. A fuel cell system, comprising:

at least one fuel cell stack according to claim 6.

10. A motor vehicle, comprising:

a fuel cell system according to claim 9.

11. The motor vehicle of claim 10, wherein the motor vehicle is at least a partially electrically driven motor vehicle.

12. The bipolar plate according to claim 1, wherein the pitch is in a range from 20° to 70°.

* * * * *